UNITED STATES PATENT OFFICE.

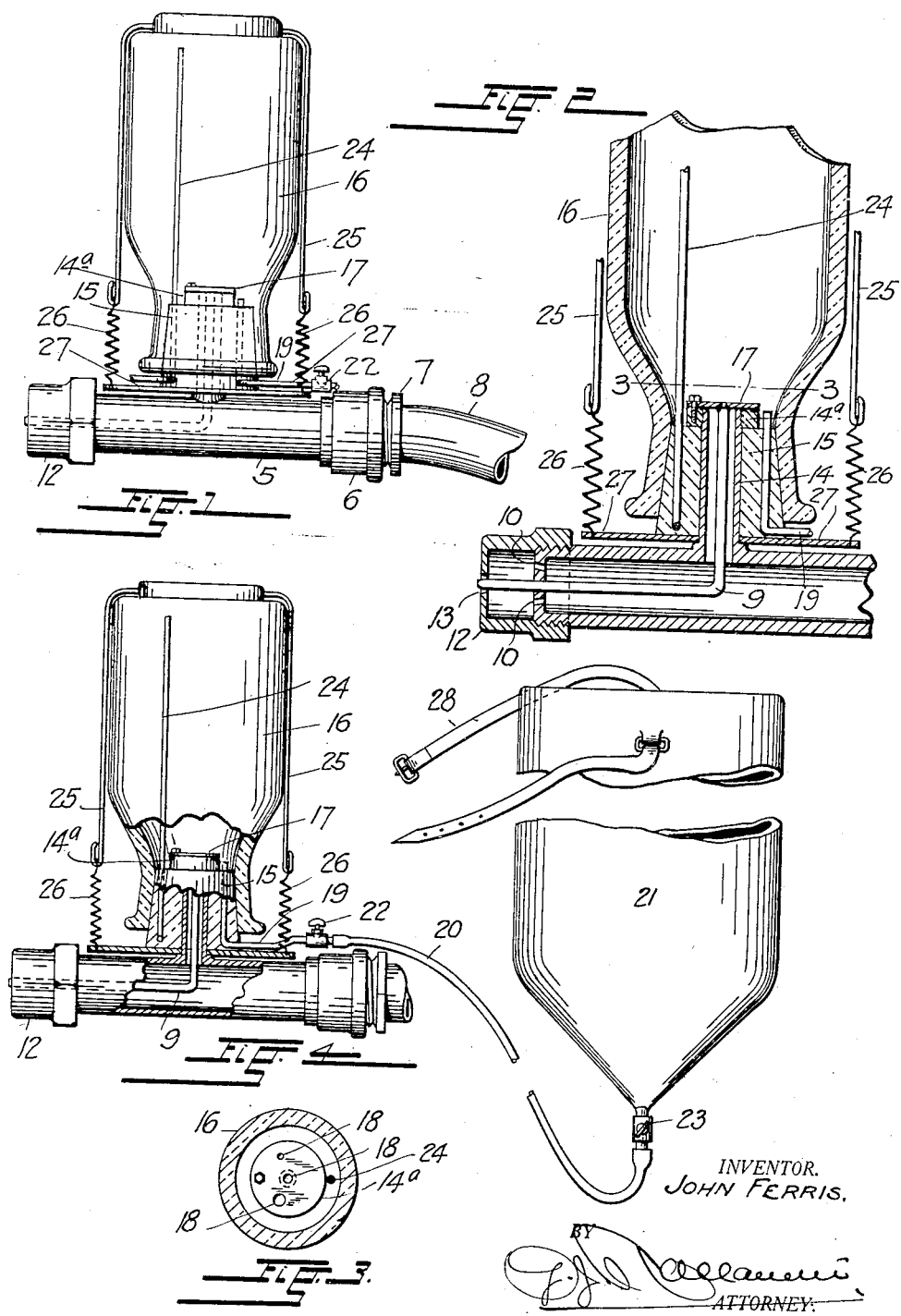

JOHN FERRIS, OF ENGLEWOOD, COLORADO.

SPRAYING DEVICE.

1,370,687.  Specification of Letters Patent.  Patented Mar. 8, 1921.

Application filed March 7, 1919.  Serial No. 281,159.

*To all whom it may concern:*

Be it known that I, JOHN FERRIS, a citizen of the United States, residing at Englewood, in the county of Arapahoe and State of Colorado, have invented certain new and useful Improvements in Spraying Devices, of which the following is a specification.

This invention relates to spraying devices, and its primary object is to provide in combination with the nozzle of a garden hose, means for mixing with water issuing therefrom, a liquid insecticide for the purpose of destroying insects on plants, trees and bushes.

The invention may also be employed for mixing a chemical substance with water discharged from a nozzle, for extinguishing fires and is in short adapted for any purpose which requires the use of a spray of different liquids in intermixture.

An embodiment of my invention is illustrated in the accompanying drawings in which similar characters of reference designate corresponding parts throughout the several views, and in which—

Figure 1 is a side elevation of the nozzle of a garden hose to which my invention is applied;

Fig. 2, a fragmentary longitudinal section of the forward portion of the nozzle and the therewith associated parts of the present invention:

Fig. 3, a section taken on the line 3—3, Fig. 2, and

Fig. 4, a sectional elevation of the nozzle shown in Fig. 1 in connection with a separated reservoir.

Referring more specifically to the drawings, 5 designates a nozzle provided with a swiveled nut 6 for its connection with a threaded plug 7 at the end of a garden-hose 8.

The nozzle has at its forward end a central opening for the passage and support of a tube 9 leading from the insecticide container as will hereinafter be more fully explained, and around said opening, a plurality of apertures 10 for the discharge of water.

A cap 12 screwed upon the exteriorly threaded end of the nozzle has a central opening 13 into which enters the tip of the above-mentioned tube and through which the water entering through the apertures 10 in the end of the body-portion of the nozzle, is dispersed in the form of a spray.

A hollow stem 14 projecting laterally from the nozzle supports a tapering stopper 15 of cork, rubber, or other elastic material to close the mouth of an inverted bottle 16 which constitutes the reservoir in which the insecticide or chemical substance to be mixed with the water issuing from the nozzle, is contained.

A nut 14$^a$ screwed upon the end of the stem secures the cork and provides a support for a pivoted perforated disk 17 which controls the passage of liquid from the bottle into the mouth of the tube 9.

This tube, as is hereinbefore explained, is supported in a central opening at the discharge end of the nozzle, is bent at right angles and passes through the stem 14 to engage the under surface of the disk 17.

The disk has a plurality of openings 18 of different sizes lying in an arc concentric with its pivotal axis to be brought separately in register with the mouth of the tube.

A U-shaped clasp 25 connected by coiled springs 26 to oppositely extending arms 27 of a plate held between a shoulder on the stem and the stopper, embraces the bottle to prevent its displacement.

A tube 19 passing through an opening in the stopper is provided to connect the container with a flexible conduit 20 leading from a reservoir separate from the nozzle as shown at 21 in Fig. 3 of the drawings.

A stop-cock 22 closes the tube 19 when it is not connected with the reservoir 21 and a cock 23 on a nipple of the reservoir by which it is connected with the conduit, controls the outflow of liquid.

A pipe 24 extending through the stopper connects the space in the upper portion of the inverted bottle, with the atmosphere to provide the air-pressure required for the discharge of its contents through the tube 9.

The air-pipe also provides a most convenient medium for terminating the discharge of insecticide at any time it is desired to use the nozzle for spraying water only, it being merely necessary to turn the nozzle so that the bottle extends beneath instead of above the same, to immediately stop the passage of liquid into and through the tube 9.

In the operation of my invention, the water supplied through the hose, enters the chamber in the cap 12 through the opening in the end of the body-portion of the nozzle and is ejected in the form of a spray through the annular space of the central opening 13 around the tip of the tube 9.

With the nozzle in the position shown in the drawings, in which the container 16 extends above the same, a spray of liquid passing through the tube is simultaneously ejected at the end of the nozzle and mixes with the water for the purpose of destroying insects on plants, trees or shrubs with which the spray comes in contact.

The quantity of the insectide passing through the tube is readily regulated by adjustment of the perforated plate 17 before the bottle is placed upon the stopper, and when it is required to spray an extensive growth of trees or plants, the larger reservoir 21 is connected with the tube 19 and supported on the back of the user by a strap 28. The contents of the reservoir 21 enter the container as rapidly as the liquid is discharged therefrom through the tube 9 and the nozzle may thus be used for a considerable period without replenishment.

Having described my invention what I claim and desire to secure by Letters Patent is:

1. A spraying device comprising a nozzle, a stopper thereon, a container having a mouth fitting the stopper, a conduit leading from the container through the stopper to the discharge-end of the nozzle, and a resilient clamp for holding the container against displacement on the stopper.

2. A spraying device comprising a nozzle, a stopper thereon, a container having a mouth fitting the stopper, a conduit leading from the container through the stopper to the discharge end of the nozzle, and an air-conduit extending from the upper portion of the container, through the stopper, in connection with the atmosphere.

3. A spraying device comprising a nozzle having a laterally projecting hollow stem, a stopper on the stem, a nut on the stem securing the stopper, a container having a mouth fitting the stopper, and a conduit passing from the container through the stem, to the discharge-end of the nozzle.

4. A spraying device comprising a nozzle having a laterally projecting hollow stem, a stopper on the stem, a nut on the stem securing the stopper, a container having a mouth fitting the stopper, a conduit passing from the container through the stem, to the discharge-end of the nozzle, and a pivoted plate on the nut, covering the orifice of the conduit and having apertures of different sizes to regulate the admission of liquid thereto.

5. A spraying device comprising a nozzle, a stopper thereon, a container having a mouth fitting the stopper, a conduit leading from the container through the stopper to the discharge end of the nozzle, means for admitting air to the upper portion of the container, a reservoir, and a second conduit leading from the container through the stopper, in connection with the reservoir.

In testimony whereof I have affixed my signature.

JOHN FERRIS.